United States Patent

[11] 3,610,729

| [72] | Inventor | Howard G. Rogers |
| | | Weston, Mass. |
| [21] | Appl. No. | 834,339 |
| [22] | Filed | June 18, 1969 |
| [45] | Patented | Oct. 5, 1971 |
| [73] | Assignee | Polaroid Corporation |
| | | Cambridge, Mass. |
| | | Continuation-in-part of application Ser. No. 716,775, Mar. 28, 1968, now abandoned. |

[54] MULTILAYERED LIGHT POLARIZER
18 Claims, 2 Drawing Figs.

[52] U.S. Cl............................................. 350/157, 350/147, 350/152, 350/166
[51] Int. Cl............................................. B02b 27/28
[50] Field of Search............................... 350/147, 152, 155, 157, 166

[56] References Cited
UNITED STATES PATENTS

| 2,887,566 | 5/1959 | Marks | 350/152 X |
| 3,153,740 | 10/1964 | Murphy | 350/152 X |
| 3,213,753 | 10/1965 | Rogers | 350/157 |
| 3,438,691 | 4/1969 | Makas | 350/157 |
| 3,497,284 | 2/1970 | Kosanke et al. | 350/157 |

*Primary Examiner*—David Schonberg
*Assistant Examiner*—Paul R. Miller
*Attorneys*—Brown and Mikulka, W. D. Roberson and F. H. Brustman ABSTRACT: This disclosure is directed to a highly efficient linear polarizer which is effective to separate normally incident light thereon into two oppositely polarized components, one of which is transmitted and another component which is reflected.

PATENTED OCT 5 1971

3,610,729

INVENTOR.
HOWARD G. ROGERS

BY Brown and Mikulka
and
Frederick H. Brustman
ATTORNEYS

MULTILAYERED LIGHT POLARIZER

CROSS-REFERENCE TO RELATED APPLICATION

This application is a continuation-in-part of U.S. Pat. application Ser. No. 716,775, filed Mar. 28, 1968 for a Light Polarizer, now abandoned.

BACKGROUND AND SUMMARY OF THE INVENTION

The polarizer of the present invention belongs to the class of polarizers which not only transmit polarized light but also reflect a substantial portion of polarized light. Most of the polarizers of the reflection type perform poorly, however, and those that have better performance tend to be bulky and expensive and are seldom used to polarize light in the visual range. The portion of the light that is transmitted by these polarizers is typically only partially polarized in one direction and only a small portion of the incident light is transmitted thereby. A polarizer effective to efficiently linearly polarize a large portion of the light incident thereon and transmit substantially all of one polarized component of light while reflecting substantially all of the orthogonally polarized component is obviously highly desirable and it is toward this end that this invention is directed.

To attain this kind of performance the polarizer of the present invention comprises layers of certain materials. The layers may be alternately made of birefringent and isotropic materials in which case one of the two indices of refraction of the birefringent material substantially matches the index of refraction of the isotropic material of the adjoining layer. In another embodiment of the invention the layers may be alternately made of two different birefringent materials so related that the lower of the two indices of refraction of one of the materials substantially matches the higher of the two indices of refraction of the other material. When adjacent layers of the latter embodiment are both positively, or negatively, birefringent then their optic axes should be perpendicular; when they are of opposite birefringent sign then their optic axes should be parallel. This latter condition is very advantageous, as explained below.

When in use, light of or within a certain range of a selected wavelength of light incident on the polarizer will be divided into two components, one which passes through the successive layers of the polarizer and is transmitted thereby linearly polarized and vibrating in one direction and another component which is reflected by the polarizer at the interfaces of the various layers, the reflected component being also linearly polarized and vibrating in an orthogonal direction to the transmitted one.

To attain the extremely high efficiency previously mentioned the layers should have an optical thickness of substantially one-quarter the wavelength of a selected wavelength of light. With this arrangement due to the reinforcement phenomenon which takes place both the reflectance and transmission of the oppositely polarized components are maximized and the transmitted polarized component, for example, may approach 50 percent of the incident light thereon.

Accordingly, it is an object of this invention to provide a highly efficient polarizer which polarizes light incident thereon into two linear polarized components, reflecting one component and transmitting another.

It is another object of this invention to provide a reflective-transmissive polarizer which transmits and reflects a higher proportion of linearly polarized light than has heretofore been attainable.

Still another object of this invention is to provide a multilaminar polarizer in which successive layers alternate between a transparent birefringent material and a transparent material having a refractive index substantially matching one of the two refractive indices of the birefringent material.

Another object of this invention is to provide a multilaminar polarizer in which successive layers alternate between positive and negative transparent birefringent materials, the lower refractive index of one being substantially equal to the higher refractive index of the other.

Other objects of this invention will in part be obvious and will in part appear hereinafter.

The invention accordingly comprises the article possessing the features, properties and the relation of components which are exemplified in the following detailed disclosure and the scope of the application of which will be indicated in the claims.

DESCRIPTION OF THE PREFERRED EMBODIMENT

Figure 1:
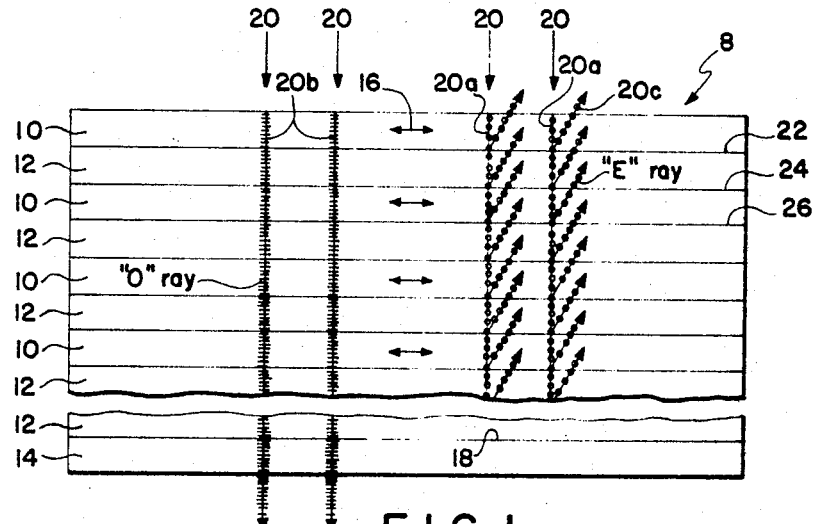
FIG. 1 shows a multilayer polarizer with the incident light thereon being partly transmitted and partly reflected as separate linearly polarized components vibrating in orthogonal directions.

The polarizer 8 as shown in FIG. 1 is formed having alternate layers 10 and 12 of birefringent material and isotropic material on a transparent substrate 14. Vacuum deposition represents one method for forming the layers, since it allows precise control of the thickness of the layers down to almost molecular dimensions. Coextruding and stretch orienting multilayered birefringent polymer films represent another method for making the polarizer described herein. As will be shown later the thickness of each layer is critical to the high efficiency of performance of the present polarizer.

The number of alternate layers 10 and 12 required to achieve a specific performance depends to a great extent on the refractive indices of the particular materials chosen to form the layers. Desirable improvements in performance can be obtained by adding many alternating layers to the polarizer structure. Generally, the more alternating layers the better. With vacuum deposition though, it is desirable to limit the number of layers. They must be laid down in consecutive order. It is therefore a tedious and time-consuming process when very many layers are desired. Multilayered vacuum deposited structures also tend to be mechanically unstable, because individual layers are usually in a highly stressed condition due to the deposition process, and to scatter light. The coextrusion process surmounts these difficulties. It can produce a polarizer structure having a great number of very thin alternating layers of two or more materials in one continuous process. Structural instability and light scattering are inconsequential.

The layers 10 are each composed of a birefringent material. For instance, the material may consist of a mixture of nine parts terephthalic acid to one part isophthalic acid. This material is found to have two indices of refraction of 1.436 and 1.706. Additionally, such birefringent polymer materials as polystyrene, polymethyl-methacrylate, polysulfone, poly(para-xylylene) and polyethylene-terephthalate can be used. While other polymer materials exhibit some birefringence, the latter ones can be made very strongly birefringent and, therefore, are much more suitable for use in this invention. Other materials may obviously be used in forming the birefringent layer and should be selected to have as great a difference between the two indices of refraction as possible since the number of layers in the polarizer can be substantially decreased when using birefringent materials having a greater difference between their indices of refraction.

The isotropic layers 12 may be composed of a number of different materials with the requirement that its refractive index substantially match one of the refractive indices of the birefringent material layers on either side thereof. Some examples of materials which are useful for this purpose include fluorinated polymers, magnesium fluoride and cellulose acetate butyrate. The isotropic layers can also be vacuum deposited so that their thickness can be precisely controlled. Alternately, the isotropic layer may be coextruded simultaneously with the birefringent layers interleaved therebetween.

As shown in FIG. 1 the optical axis 16 of each birefringent layer lies in a plane parallel to the planar substrate surface 18. This is accomplished during the vacuum depositing of the birefringent layers on the substrate by properly orienting the substrate layer in the vacuum chamber using well-known techniques so that the material is deposited in the desired manner. This vacuum deposition technique is also used to control the optical thickness of each layer 10 and 12 so that their thickness is as precise as possible. An equivalent optic axis orientation is accomplished in a coextruded form of the polarizer through the use of a stretch orientation operation. This procedure is well known to the art. It is done following the coextrusion process. Layer thickness is controlled by the coextrusion process. An allowance for dimensional changes expected in the layer thickness during the stretching step should be made.

FIG. 1 schematically shows a number of light rays 20 incident on polarizer 8 and traveling in a direction perpendicular to the surface thereof. As an example, the birefringent layers 10 may have a pair of refractive indices $n_o=1.436$ and $n_E=1.706$ and the refractive index of each isotropic layer may be taken as $n=1.436$. As each ray 20 passes through the first birefringent layer 10, it is resolved thereby into two components shown as separate rays, namely, an extraordinary or "E" ray 20a for which the birefringent layer has the higher index $n_E=1.706$ and an ordinary ray or "O" ray 20b for which the birefringent layer has, for example, the lower index $n_O=1.436$, the rays traveling in a similar direction and with their vibration azimuths relatively orthogonally disposed as depicted in the drawing. As shown in FIG. 1, a portion 20c of the "E" rays 20a is reflected at the first interface 22 reached, it being recalled that the refractive index of an isotropic layer was given at $n=1.436$. The reflection is due to the refractive index discontinuity at the interface between the layers 10 and 12 which exists for the "E" polarization but not the "O" polarization. For purposes of illustration the reflected light rays 20c are shown as being reflected at a slight angle while in actuality they are reflected straight back in the direction of rays 20a. Thereafter each interface such as 24 and 26 will reflect a further portion of ray 20a. The rays 20b are unreflected at the interface 22 because the refractive index for "O" rays 20b in layer 10 matches that of layer 12 and in fact, these rays 20b will pass through all layers 10 and 12 unreflected and comprise that portion of the light incident on the polarizer that is transmitted thereby.

In order to greatly increase the reflectivity of the polarizer 8 each layer 10 and 12 is made to have an optical thickness of one-quarter the length of a selected wavelength. The optical thickness is equal to the physical thickness multiplied by the index of refraction of the layer material. The wavelength selected is preferably in the middle of the visible spectrum, for example, 550 nm. so that the polarizer is effective over a substantial range of visible light. This arrangement utilizes optical interference to enhance the efficiency of the present polarizer. The following discussion relates to phase changes in a light wave, not to changes in the polarization azimuth of the light wave. In analyzing the optical properties of the polarizer, it is important to remember that light suffers a phase change of $\pi$ on reflection when it goes from a medium of low refractive index to a medium of higher refractive index while it suffers no phase change on reflection when it goes from a medium of high refractive index to a medium with a lower refractive index. Thus, in FIG. 1, a light ray such as 20a, as it passes through the first quarter-wave birefringent layer 10 will suffer a phase change $\pi/2$. As the light ray strikes the first interface 22 part of it is reflected back through the first birefringent layer 10 again suffering a phase change of $\pi/2$, the total phase change being equal to $\pi/2+\pi/2=\pi$. Note that the ray 20a suffers no phase change on reflection at interface 22 due to the rule as stated above. Now as the remaining portion of ray 20a strikes the second interface 24, it has traveled through two layers suffering a phase change of $\pi/2+\pi/2$ in one direction and $\pi/2+\pi/2$ on reflection. The ray 20a will also suffer a phase change of $\pi$ on reflection due to the above rule and the total phase change will equal $4\pi/2+\pi$ or $3\pi$. Thus, in accordance with this analysis, the ray 20a will always suffer a phase change of some multiple of $\pi$ as it is reflected from each 2. every interface in the multilayer polarizer. Each reflected component 20c of ray 20a and other such similar rays will reinforce one another resulting in substantially total reflection of the one polarized component of incident light represented by rays 20a providing the number of layers and interfaces are sufficient. The other component 20b will pass undisturbed through the multilayer polarizer 8 so long as the refractive index of the isotropic layers 12 match one of the refractive indices of the birefringent layers 10. Since substantially none of the rays 20a are transmitted, the entire amount of light output from polarizer 8 consists of rays 20b, all polarized in one direction.

Thus, the very high efficiency previously referred to is achieved by carefully controlling the thickness of the layers and selecting materials with the requisite matching refractive indices.

It should be noted that it is not absolutely necessary that a perfect match exist between the refractive indices for one polarization component in adjacent layers. Adequate results are obtained if the refractive index discontinuity at the interfaces is less for one polarization component than the other. The former condition is the optimum.

Figure 2:
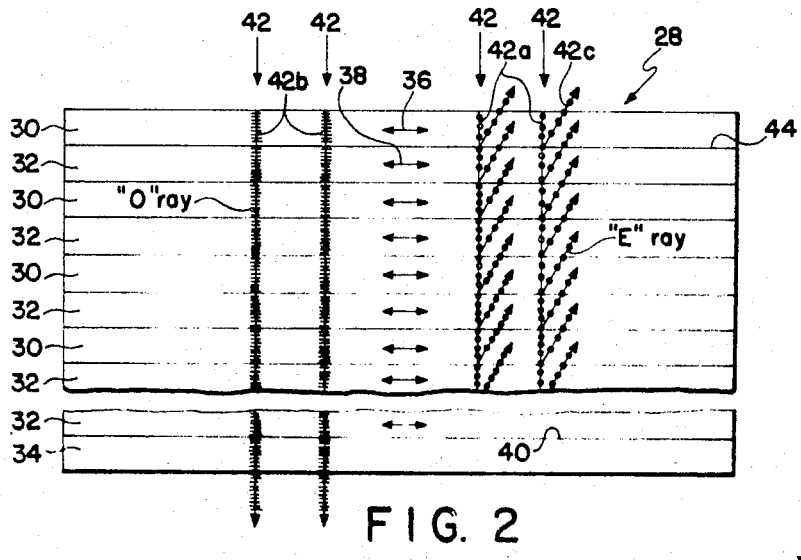
FIG. 2 is similar to FIG. 1 but the alternative layers thereof are each composed of a different birefringent material rather than the alternate birefringent and isotropic materials composing the layers OF FIG. 1.

As shown in FIG. 2 of the drawing, the present invention may also comprise a polarizer 28 wherein the alternate layers 30 and 32 on transparent substrate 34 may be made of two different birefringent materials, one positive and the other negative, so related that the lower of the two indices of refraction of one of the materials substantially matches the higher of the two indices of refraction of the other material. A positive birefringent material is one in which $n_E$ is greater than $n_o$. The optic axes 36 and 38 of these layers lie in planes parallel to the planar surface 40 of the substrate 34 and the rays 42 incident on polarizer 28 will be resolved into two oppositely polarized components 42a and 42b. The rays 42b whose refractive index is the same as the matching indices of layers 30 and 32 will pass unattenuated by reflection through the interfaces between said layers, such as interface 44, while the rays 42a having a nonmatching index of refraction will be reflected at said interfaces. As layers 30 and 32 have an optical thickness of one-quarter the wavelength of a selected wavelength of visible light, the reflected components 42c will reinforce one another, as explained above with reference to the earlier-described embodiment of the invention, resulting in substantially total reflection of one polarized component represented by rays 42a. Since substantially none of the rays 42a are transmitted, the entire amount of light output from polarizer 28 consists of rays 42b, all polarized in one direction as in the earlier embodiment.

As in FIG. 1, for purposes of illustration the reflected light rays 42c are shown as being reflected as a slight angle while in actuality they are reflected straight back in the direction of rays 42a.

It is apparent that the best polarizer according to this invention, is the one with the greatest number of interfaces. Depositing layers by evaporation techniques may be overly time consuming and expensive for a contemplated application. With current evaporation techniques, there are also mechanical limits to the number of layers which can be successfully coated onto a substrate. There is an inexpensive and suitable method for forming the multilayer structure. This process is the coextrusion of multilayer plastic sheet. Multilayer coextrusion is a technique whereby 250 or more interlaminated layers, of at least two different plastic materials can be produced simultaneously in a single sheet. A distinct interface between the materials of adjacent layers is maintained in the coextrusion process. Certain materials readily lend themselves to the coextrusion process and can also be rendered birefringent. These materials include polystyrene polymethylmethacrylate, polysulfone, poly(para-xylylene) and polyethylene-terephthalate. Birefringence is developed in the coextruded multilayer plastic sheet by a subsequent stretch orientation step. Unidirectional stretching of the multilayer sheet develops the potential birefringence of the polymer layers and orients their optic axis parallel to the stretch direction. Ideally the multilayer plastic sheet is stretched until one refractive index of the birefringent layers equals refractive index of the adjacent layer. Then there is no refractive index discontinuity for one polarization component. In practice it is sufficient to stretch the multilayer sheet until the refractive index discontinuity is less for one polarization component than the orthogonal component.

The structure of a multilayer coextruded polarizer is similar to those shown in FIGS. 1 or 2 except that substrates 14 or 34 are not required. Inasmuch as multilayer coextruded sheets are typically self-supporting, bases are unnecessary for building the layer structures on.

There is a special advantage to be achieved by using alternating layers of positive and negative birefringent materials rather than alternating layers of birefringent and isotropic materials. With practical birefringent materials, it is possible to achieve larger net differences in refractive index between the layers for one polarization component by combining two birefringent materials having relatively large but opposite refractive index differences. Assume two birefringent materials, each with a relatively large difference, on the order of 0.1, one positive and one negative. The refractive index for one polarization component, $En_g$, can be made equal for both materials. Then for the orthogonal polarization component the combined refractive index difference $\Delta n_0$ is 0.2. This is a refractive index discontinuity twice as great as can be achieved using only one of these birefringent materials and an isotropic material. The resultant interface is a much more effective polarizing element.

Layer thicknesses may be tailored to multiples of one-quarter wavelength optical thickness. This can enhance the performance of the multilayer reflection polarizer of this invention for a particular spectral band or line.

Birefringence is not exhibited by the layers of a multilaminar coextrusion as it comes from the extruder. It must be developed in the polymer layers in a subsequent operation. Stretching the multilayer sheet induces birefringence in the polymer layers of the multilayer coextrusion. It is known that certain polymers become birefringent when stretched, in proportion to the degree of stretching. During the stretch operation layer thicknesses change in proportion to the amount of stretch. Stretch allowance is to be made in the initial thickness of the individual layers. This compensates for the dimensional change during stretching. Thus, after stretching, the layers have the correct thickness to enhance the rearward reflection to the rejected polarization component.

Exemplary of the above-described coextrusion embodiment, polystyrene and polymethyl-methacrylate were coextruded into a multilaminar sheet containing 250 alternating layers. Each layer was one-quarter optical wavelength in thickness. Polystyrene can have imparted to it strong negative birefringence. Polymethyl-methacrylate can be made positively birefringent to a small degree. The coextruded multilaminar polystyrene polymethyl-methacrylate sheet displayed no ability to polarize light. Stretch orientation generated sufficient birefringence in the alternating layers to demonstrate the ability of the stretched assembly to polarize light. The multilayer coextrusion was stretched approximately 3 percent at 30° C.; just short of the fracture point. Generating a smaller refractive index discontinuity for one polarization component than the other was all that was necessary. Though a refractive index discontinuity existed at each interface for both polarization components, the discontinuity was less for one component than the other. The polarization component experiencing the lesser discontinuity suffered a smaller loss than the other on transmission. This was sufficient to demonstrate the stretch oriented structure's ability to polarize light. The amount of stretching was not great enough to materially affect individual layer thicknesses. Optical behavior of the quarter wavelength thick layers was substantially unaffected. The stretching operation developed birefringence in all the polymer layers and simultaneously oriented the optic axes parallel to each other and the plane of the layers. Placed parallel to and in front of a polarized light source, this stretch oriented assembly was rotated in its plane. It was observed that the amount of light transmitted by the polarizer varied in relation to its angular position.

Since certain changes may be made in the above article, without departing from the scope of the invention herein involved, it is intended that all matter contained in the above description or shown in the accompanying drawing shall be interpreted as illustrative and not in a limiting sense.

What is claimed is:

1. A highly efficient multilayered reflective-transmissive linear polarizer comprising a plurality of layers on a planar surface of a transparent substrate, said layers being of an optical thickness of one-quarter the wavelength of a selected wavelength of light and each successive layer being alternately composed of a birefringent material and a material having an index of refraction substantially matching one of the two indices of refraction of the birefringent material.

2. A highly efficient multilayered reflective-transmissive linear polarizer comprising a plurality of layers on a planar surface of a transparent substrate, said layers being of an optical thickness of one-quarter the wavelength of a selected wavelength of light and each successive layer being alternately composed of a birefringent material and an isotropic material with the index of refraction of said isotropic material substantially matching one of the two indices of refraction of the birefringent material.

3. A highly efficient multilayered reflective-transmissive linear polarizer comprising a plurality of layers on a planar surface of a transparent substrate, said layers being of an optical thickness of one-quarter the wavelength of a selected wavelength of light and each successive layer being alternately composed of a birefringent material and an isotropic material with the index of refraction of said isotropic material substantially matching one of the two indices of refraction of the birefringent material, and said layers of birefringent material having optic axes lying in a plane substantially parallel to said planar surface of said transparent substrate.

4. The polarizer of claim 3 wherein said birefringent layers are composed of a mixture of terephthalic acid and isophthalic acid.

5. A highly efficient multilayered reflective-transmissive linear polarizer for receiving unpolarized light and transmitting and reflecting a large portion of said light in the form of polarized light rays comprising layer means including a plurality of interfaces between said layer means, said interfaces being substantially nonrefractive of a first portion of said light rays having a given vibration azimuth but reflecting a predetermined amount of a second portion thereof having a vibration azimuth orthogonally disposed relative to that of said first portion, said interfaces being bounded on one side by a birefringent layer having one index of refraction substantially equal to an index of refraction of a layer at the opposite side thereof and a second index of refraction differing thererfrom, said layers on either side of said interfaces each having an optical thickness of one-quarter the wavelength of a selected wavelength of light incident on said polarizer.

6. A highly efficient multilayered reflective-transmissive linear polarizer comprising a plurality of layers on a planar surface of a transparent substrate, said layers being of an optical thickness of one-quarter the wavelength of a selected wavelength of light and each successive layer being alternately composed of two different birefringent materials, the materials being such that the lower of the two indices of refraction of one of the materials substantially matches the higher of the two indices of refraction of the other material.

7. A highly efficient multilayered reflective-transmissive linear polarizer comprising a plurality of layers on a planar surface of a transparent substrate, said layers being of an optical thickness of one-quarter the wavelength of a selected wavelength of light and each successive layer being alternately composed of two different birefringent materials, the materials being such that the lower of the two indices of refraction of one of the materials substantially matches the higher of the two indices of refraction of the other material, and said layers of birefringent material having optic axes lying in a plane substantially parallel to said planar surface of said transparent substrate.

8. A highly efficient multilayered reflective-transmissive linear polarizer comprising:

a plurality of layers of selected materials arranged in an interlaminar array to define a corresponding plurality of interfaces;

said materials within alternate said layers having different polarization characteristics causing said interfaces to permit the transmission, substantially unattenuated, of one polarization component of light normally incident thereon and to reflect, at least in part, the orthogonal polarization component of said incident light.

9. The linear polarizer of claim 8 wherein any said layer has an optical thickness equal to a whole number multiple (including one) of one-quarter wavelength of said light incident thereupon.

10. The linear polarizer of claim 8 wherein alternate said layers of said selected materials are birefringent.

11. The linear polarizer of claim 8 in which:

alternate said layers of said selected materials are positively birefringent; and the layers of said selected materials intermediate said alternate layers are negatively birefringent.

12. The linear polarizer of claim 8 wherein said materials forming alternate said layers are birefringent and said materials forming layers intermediate said alternate birefringent layers are isotropic.

13. A highly efficient multilayer reflective-transmissive linear polarizer for receiving normally incident light and transmitting one polarization component and reflecting the orthogonal polarization component thereof, comprising:

a plurality of layers of selected materials arranged in an interlaminar array to define interfaces between adjacent said layers, said interfaces having a greater refractive index discontinuity for a first polarization component of said light than for the orthogonal polarization component thereof, whereby the amount of light reflected at each said interface is greater for said first polarization component of light than for said orthogonal polarization component.

14. The polarizer of claim 13 wherein the thicknesses of said layers are selected such that reflections of said first polarization component of said incident light are caused to constructively interfere.

15. A polarizer as in claim 14 wherein a first of said layer materials is birefringent and a second of said layer materials has a refractive index which substantially matches one of the refractive indices of said birefringent material, said materials being in alternating superposed order to form a plurality of said interfaces.

16. A polarizer as in claim 15 wherein said first material is positively birefringent and said second material is negatively birefringent.

17. A polarizer as in claim 15 wherein said birefringent material is selected from the group consisting of:
polystyrene;
polyethylene terephthalate;
polysulfone;
polycarbonate; and
poly(paraxylylene).

18. A highly efficient multilayer reflective-transmissive linear polarizer for receiving normally incident light and transmitting one polarization component and reflecting the orthogonal polarization component thereof, comprising:

a plurality of layers, each having an optical thickness of one-quarter wavelength of a reflected wavelength of light, the materials of said layers alternating between birefringent polystyrene and polymethyl-methacrylate to form interfaces, each said interface having a polymethyl-methacrylate layer on one side and a birefringent polystyrene layer on the opposite side.